United States Patent [19]
Haley, Sr.

[11] Patent Number: 5,251,925
[45] Date of Patent: Oct. 12, 1993

[54] TRANSPORTABLE AND COLLAPSIBLE BAG CARRYING CART

[76] Inventor: Thomas S. Haley, Sr., 14 Hemlock Ct., Cromwell, Conn. 06416

[21] Appl. No.: 685,823
[22] Filed: Apr. 16, 1991
[51] Int. Cl.⁵ .................................................. B62B 3/02
[52] U.S. Cl. ................................... 280/641; 280/651; 248/98; 248/99
[58] Field of Search ............... 280/639, 641, 649, 651, 280/39, 42, 642; 248/95, 97, 98, 99, 100; 220/403, 404; 108/135

[56] References Cited

U.S. PATENT DOCUMENTS

| | | | |
|---|---|---|---|
| 2,155,896 | 4/1939 | Goldman | 280/641 |
| 2,967,716 | 1/1961 | Murcott | 280/641 |
| 4,549,748 | 10/1985 | Haley, Sr. | 280/641 |
| 4,793,628 | 12/1988 | Haley, Sr. | 280/641 |

*Primary Examiner*—Richard M. Camby
*Attorney, Agent, or Firm*—Fishman, Dionne & Cantor

[57] ABSTRACT

A bag holding cart for use in collecting and conveying materials in a hospital, hotel, or other institution (as well as in industrial and residential environments) comprising a pair of inverted U-shaped frame support members having an adjustable pivotable connection at about their respective centers is presented. This adjustable pivotable connection is an important feature of the present invention as it permits the cart to be adjusted for various bag sizes. A unitary base is provided to the lower portion of the cart. This base is pivotably connected to one of the frame members and is detachably connected to the other frame member by a bracket connected to the base, which affords a snap lock between the base and frame member. This bracket is also an important feature of the present invention as it prevents vertical movement of the base. A cover is pivotably attached to the upper portion of the cart and may be activated by a foot pedal which is linked to the cover by a pair of wire supports.

11 Claims, 4 Drawing Sheets

TRANSPORTABLE AND COLLAPSIBLE BAG CARRYING CART

BACKGROUND OF THE INVENTION

This invention relates to a transportable bag holding device for use in collecting and conveying materials such as bedding, laundry or trash in hotels, hospitals or the like. More particularly, this invention relates to a new and improved bag carrying cart which is similar to the cart disclosed in my earlier U.S. Pat. Nos. 4,549,748 and 4,793,628, but which includes several improved features including, for example, an adjustable pivotable connection and a bracket for securing the base.

My earlier U.S. Pat. Nos. 4,549,748 and 4,793,628, which are incorporated herein in their entirety, both related to a novel bag holding device for use in collecting and conveying materials such as bedding, laundry or trash in a hospital, hotel or other institution. The bag holding cart of U.S. Pat. No. 4,549,748 is comprised, in part, of a pair of inverted U-shaped frame support members pivotally connected at about their respective centers. A foldable base is provided to the lower portion of the cart, the base preferably having a locking means attached thereto. The cart is movable along conventional wheels or casters for easy transport. The upper portion of each inverted U-shaped support member is provided with novel bag retention safety bars which help to preclude bags, especially plastic bags, from sliding off the frame after material has been deposited therein. Further, a hand actuated cover or lid assembly effects adequate closure while permitting ease of opening.

The bag holding cart of U.S. Pat. No. 4,793,628 comprises a bag holding cart of the type disclosed in U.S. Pat. No. 4,549,748 having a pair of inverted U-shaped frame support members pivotally connected at about their respective centers. A unitary base is provided to the lower portion of the cart. This base is pivotably connected to one of the frame members and is detachably connected to the other frame member by a spring clip mechanism mounted on the frame member which affords a snap lock between the frame member and the base. This unitary base and associated snap lock mechanism is an important feature of U.S. Pat. No. 4,793,628 as it permits the cart to be folded in a very compact fashion for improved storage and transport.

Another important feature of U.S. Pat. No. 4,793,628 is a foot pedal actuated cover or lid. This cover is pivotably attached to the upper portion of the cart and may be actuated by a foot pedal which is linked to the cover by a pair of wire supports. The foot actuated cover permits the lid to be opened without the use of the operator's hands. This is especially advantageous in those situations wherein the operator's arms are loaded down. In that case, the operator simply opens the lid by foot pressure and conveniently deposits the material into the bag supported on the cart.

While well suited for their intended purposes, the bag holding carts of U.S. Pat. Nos. 4,549,748 and 4,793,628 suffer from several perceived deficiencies and disadvantages. For example, while both carts will accommodate a variety of bag sizes, the bag sizes that can be employed are limited by the fixed distance between the upper portion of the U-shaped frame support members. Also, the spring clip mechanism of U.S. Pat. No. 4,793,628 (see FIGS. 5 and 7 of U.S. Pat. No. 4,793,628) comprise two spring metal clips attached to one of the U-shaped members. These spring metal clips are cumbersome to disengage and increase assembly time of the unit.

SUMMARY OF THE INVENTION

The above-discussed and other problems and deficiencies of the prior art are overcome or alleviated by the improved device for use in collecting and conveying materials in a hospital, hotel, or other institution (as well as in industrial and residential environments) of the present invention. In accordance with the present invention, a bag holding cart of the type disclosed in U.S. Pat. Nos. 4,549,748 and 4,793,628 includes a pair of inverted U-shaped frame support members which are adjustably pivotally connected about their respective centers. This adjustable pivotal connection is an important feature of the present invention since it provides adjustment for a wide variety of bag sizes. The adjustable pivotal connection is preferably provided by a plurality of swedged sections located at about the center of each frame support member. Each swedged section is associated with a hole. When the desired holes of each member are aligned, they can be fastened with knurled fasteners which will allow adjustments to be made by hand.

In accordance with another feature of this invention, a unitary base is provided to the lower portion of the cart. This base is pivotably connected to one of the frame members and is detachably connected to the other frame member by an angled U-shaped bracket on the base. This U-shaped bracket provides a snap lock between the base and the frame member. As mentioned, this bracket is also an important feature of this invention since it prevents vertical movement of the base. This avoids collapsing of the cart while it is in use. Further, a safety catch is also provided to ensure that the cart remains in its upright position during use.

A cover which is pivotably attached to the upper portion of the cart is also provided. The cover may be activated by a foot pedal which is linked to the cover by a pair of wire supports. The lower portions of each frame support member is formed to provide a means of mounting casters.

Much of the remaining structural features of the present invention are substantially similar to those features described in the aforementioned U.S. Pat. Nos. 4,549,748 and 4,793,628.

The above-described and other features and advantages of the present invention will be appreciated and understood by those skilled in the art from the following detailed description and drawings.

BRIEF DESCRIPTION OF THE DRAWINGS

Referring now to the drawings, wherein like elements are numbered alike in the several FIGURES.

DESCRIPTION OF THE PREFERRED EMBODIMENT

Figure 1:
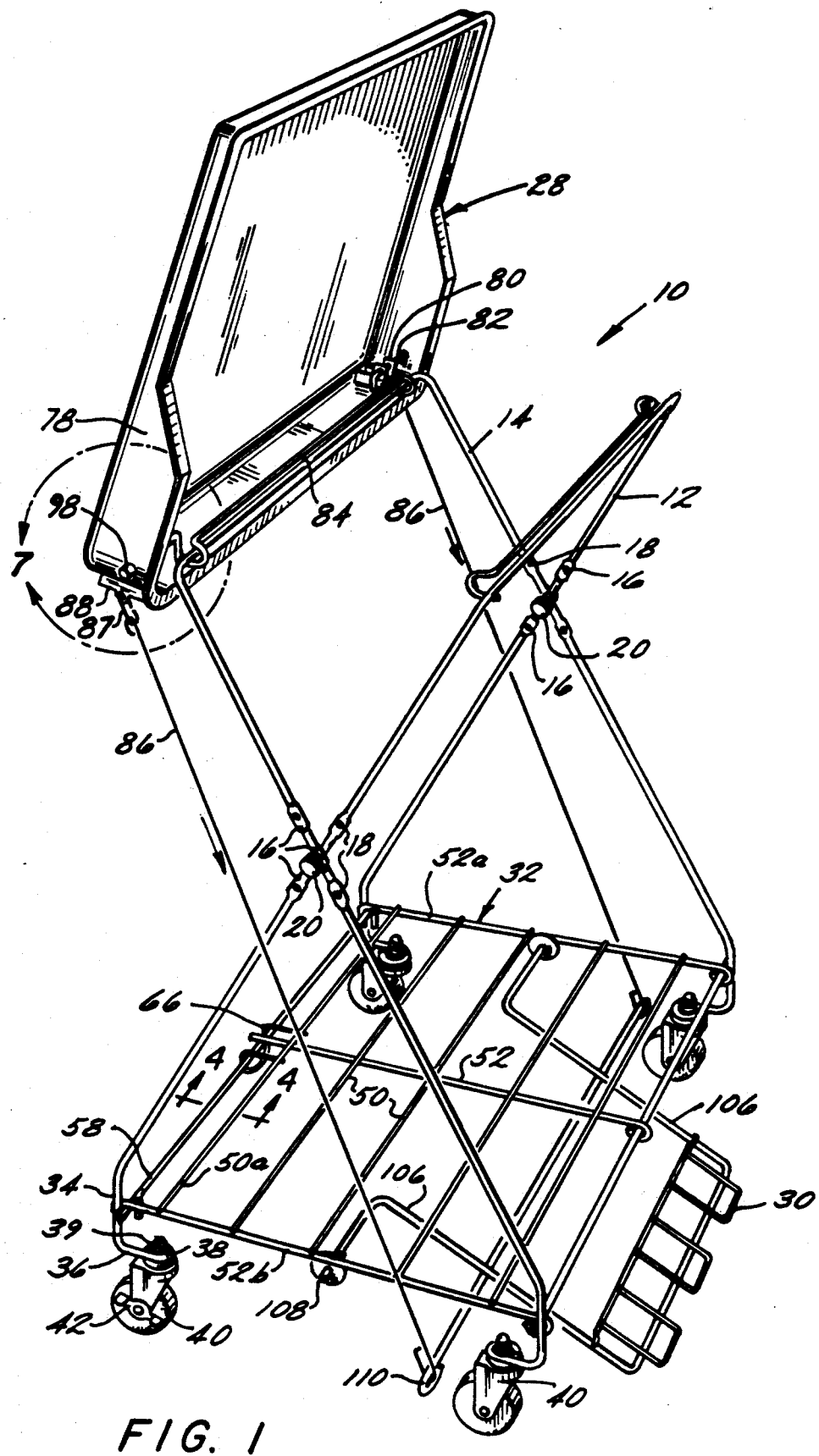
FIG. 1 is a perspective view of a cart in accordance with the present invention without a bag being inserted therein.
Figure 1A:
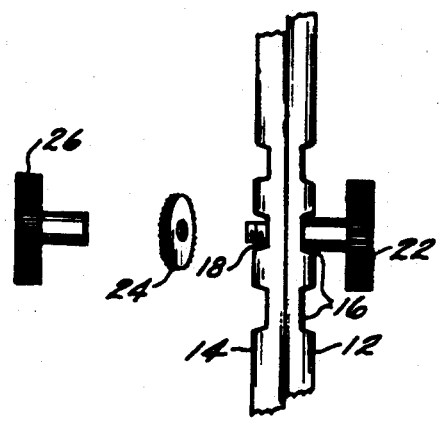
FIG. 1A is a front elevation view of the adjustable pivotal connection portion of the cart of FIG. 1.

Referring now to FIG. 1, a bag holding transportable cart in accordance with the present invention is shown generally at 10. Cart 10 is comprised of a pair of pivotally connected inverted U-shaped frame support members 12 and 14. Located at about the center of each vertical leg of U-shaped members 12 and 14 is a plurality of swedged areas 16, each having a hole 18 at about the center of the associated swedged area 16. Each hole 18 through member 12 is aligned with a hole 18 through member 14 for each corresponding vertical leg. It will be appreciated that the selection of corresponding pairs of holes 18 from each frame member 12, 14 will determine the lateral distance between the upper portion of U-shaped members 12 and 14. Members 12 and 14 may be connected by a knurled fastener assembly 20. A male knurled fastener 22 (FIG. 1A) is inserted through selected holes 18 of members 12 and 14 and fastened with a washer 24 and a female knurled fastener 26. Preferably, two additional washers are used; one washer between members 12 and 14 and the other washer between member 12 and fastener 22. Knurled fastener assembly 20 allows adjustment to be made by hand without the aid of tools. In order to preclude unintentional disassembly of the knurled fasteners, fasteners 22, 26 are constructed so that disassembly takes place only using two hands whereby fastener 22 is held stationery while fastener 26 is unscrewed. Thus, a deliberate and intentional action is needed for disassembly.

While the embodiment of this invention depicted in FIG. 1 shows each leg of each frame member 12, 14 having three swedged areas 16 defining a plurality of different bag sizes, it will be appreciated that any number of swedged areas 16 (less than or more than three) may be employed.

Figure 1B:
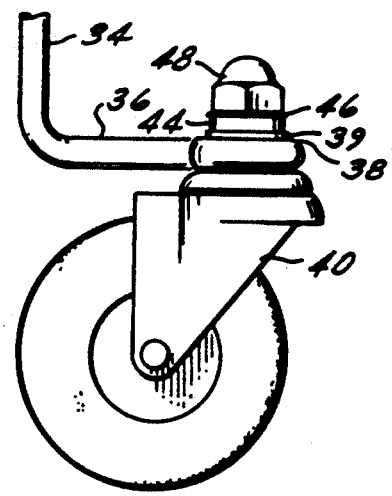
FIG. 1B is a partial side elevation of a caster installed in the cart of FIG. 1.

As will be discussed in greater detail hereinafter, cart 10 also includes a pivotable cover assembly 28 which is capable of opening and closing under the action of a foot pedal 30; and a base or rack 32 which interconnects the lower portion of frame members 12 and 14. With reference to FIGS. 1 and 1B, each U-shaped member 12 and 14 terminates at a vertical straight section 34 followed by another straight section 36 at about a 90° angle from section 34. The end of section 36 is turned upon itself forming an opening 38 in which a cylindrical shaped element 39 is attached. A conventional caster or roller 40 (which may be associated with a locking mechanism 42) may be installed in element 39. When caster 40 is inserted into element 39, a spacer 44 followed by a washer 46 and a nut 48 are employed to retain caster 40. Washer 46 is preferably comprised of nylon so as to reduce vibration which otherwise results in a loosening of nut 48.

Figure 2:
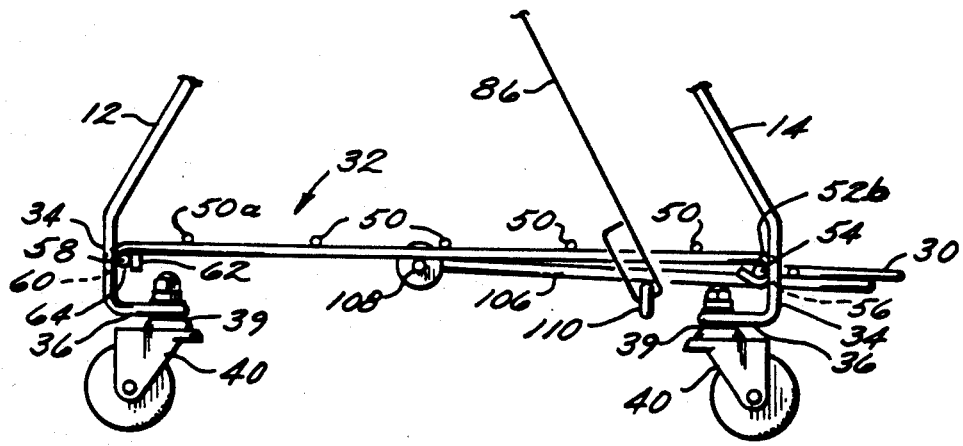
FIG. 2 is an enlarged side elevation view of the lower portion of the cart of FIG. 1.

Base or rack 32 is preferably unitary or one piece and provides support for the bags (not shown) after material (i.e., laundry, rubbish, etc.) has been added therein. Base 32 is preferably comprised of a plurality of perpendicular rods including longitudinal rods 50 and latitudinal rods 52. Base 32 is pivotably connected to the front of frame members 12 and 14 in a manner which allows it to be pivoted and folded upwardly or downwardly. Referring to FIG. 2, in one embodiment, base 32 (actually latitudinal rod 52a) is pivotably attached to a crossbar 54 interconnecting frame supports 12 and 14 via a small U-bend 56 to form a swingable hinge assembly. Crossbar 54 may be welded or otherwise secured between members 12 and 14; while U-bend 56 is an extension of latitudinal rod 52a. It will be appreciated that latitudinal rod 52a of base 32 will swing or pivot within U-bend 56. It will also be appreciated that a latitudinal rod 52 at the opposite side of base 32 is attached to crossbar 54 in the same manner.

Figure 3:
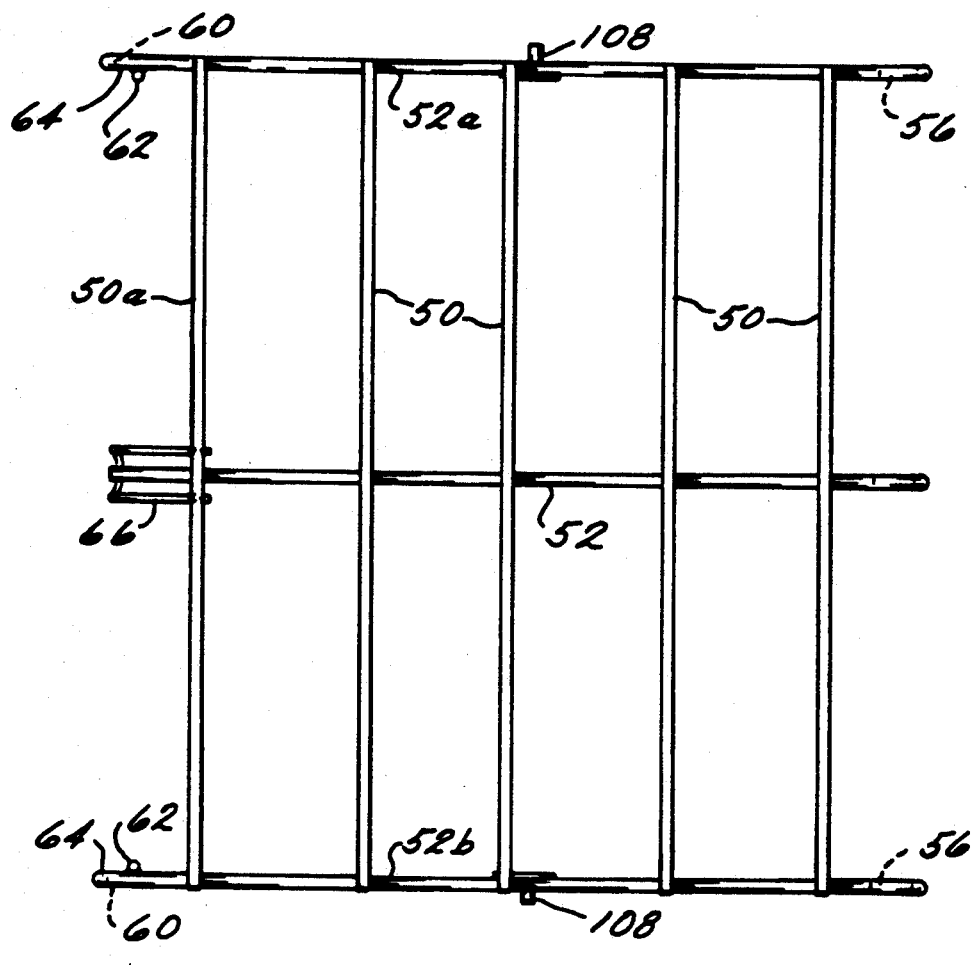
FIG. 3 is a top view of the base of the cart of FIG. 1.
Figure 4:
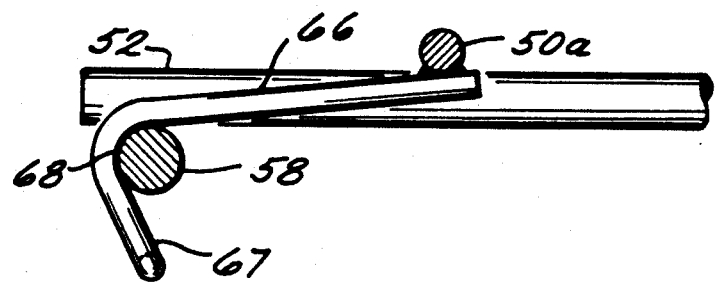
FIG. 4 is an enlarged view along the line 4—4 of FIG. 1.

The opposite end of base 32 is detachably connected to the opposing ends of support members 12 and 14. Referring to FIGS. 2, 3 and 4, a crossbar 58 interconnecting frame supports 12 and 14 is provided for receiving latitudinal rods 52 of unitary base 32. The outermost latitudinal rods 52a and 52b each have an L-bend 60 and a member 62 which together provide a channel 64 for accepting crossbar 58.

An angled U-shaped bracket 66 is attached (preferably welded) to longitudinal rod 50a. Bracket 66 snap-locks down over crossbar 58 to secure base 32, thereby securing cart 10 in the upright position shown in FIG. 1. Force is applied to bracket 66 so that ramp 67 advances along rod 58 whereupon ramp 67 flexes slightly outwardly allowing rod 58 to be fully seated within an arcuate portion 68 of bracket 66. It will be appreciated that the reverse process is followed to disengage bracket 66 from rod 58. Bracket 66 is preferably located on the center of longitudinal rod 50a of base 32.

Figure 5:
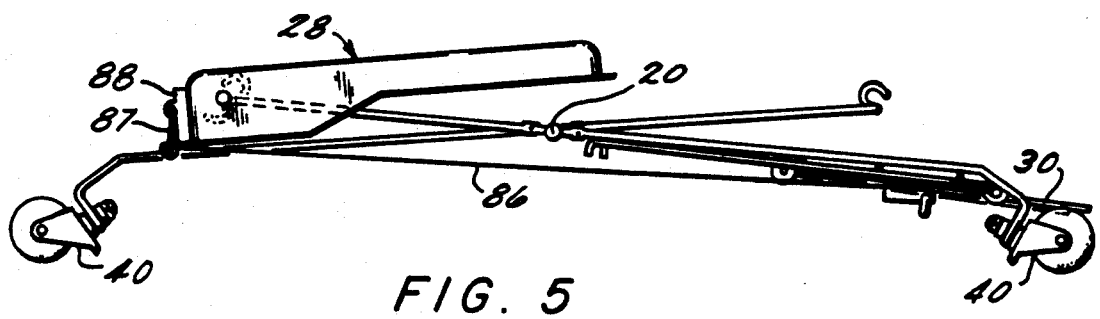
FIG. 5. is a side elevation view of the cart of FIG. 1 subsequent to being folded.

While well suited for its intended purposes, it has been found that the detachable connection between bracket 66 of base 32 and crossbar 58 may become disengaged at undesired times (e.g., during use). As a result, the cart will fold up to the position shown in FIG. 5. It is believed that such disengagement is due to incomplete snap locking of bracket 66 by the cart assembler during assembly. In an effort to prevent the cart unit from folding, in a preferred embodiment, a safety device is used to preclude undesired disengagement between base 32 and crossbar 58.

Figure 6:
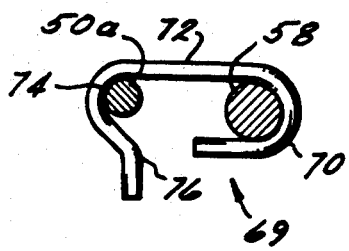
FIG. 6 is a cross-sectional elevation view of a safety bracket for use in securing and locking the base to the cart frame of the cart of FIG. 1.

Referring to FIG. 6, such a safety device is identified generally at 69. Safety device 69 comprises a preferably metal clip which is preferably permanently pivotably attached to either crossbar 58 or rod 50a. In the FIG. 6 embodiment, section 70 of clip 69 is bent about crossbar 58 to effect permanent attachment thereto. Clip 69 extends from its permanent pivotable attachment 70 to bar 58 a short linear distance 72 to a C-shaped arcuate portion 74 and finally terminates at a ramped section 76 which diverges from C-shaped portion 74.

During use, clip 69 swings freely from crossbar 58. Subsequent to bracket 66 being secured on crossbar 58, clip 69 is swung about bar 58 so that ramp 76 contacts rod 58. Next, force is applied so that ramp 76 advances along rod 58 whereupon ramp 76 and arcuate section 74 of clip 69 flex slightly outwardly allowing rod 50a to be fully seated within C-shaped arcuate portion 74. It will be appreciated that the reverse process is followed to disengage clip 69 from rod 58.

Turning now to FIGS. 1 and 2, a discussion of the foot operated cover assembly follows. The cover assembly includes lid 28 having depending side portions 78, a pair of clips 80 which slip onto an extension 82 of safety bar 84, wire support rods 86 attached via a C-shaped member 87 to clips 88 and foot pedal 30 pivotably connected to rods 52. Safety bar 84 is welded or otherwise permanently attached to the crosspiece of U-frame 14. Each clip 80 preferably have a flat base 90 with a pair of parallel sides 92 extending transverse to base 90. Aligned openings 94 are provided in each extending side 92 with extension 82 being received in openings 94. Openings 94 are sized to permit extension 82 to freely pivot therewithin. Clip 80 is attached to the back depending surface 96 of lid 28. Lid 28 also includes oppositely disposed protrusions 98 which receive either end of extension 82 and act to both align and retain lid 28 in position. Protrusion 98 also acts as a bearing surface between lid 28 and extension 82. Each clip 88 preferably has a flat base (not shown) with a side 100 extending transverse to the flat base. A tab 102 extends from side 100 having a hole 104 for retaining C-shaped member 87. Support rod 86 is attached to clip 88 by member 87.

Figure 7:
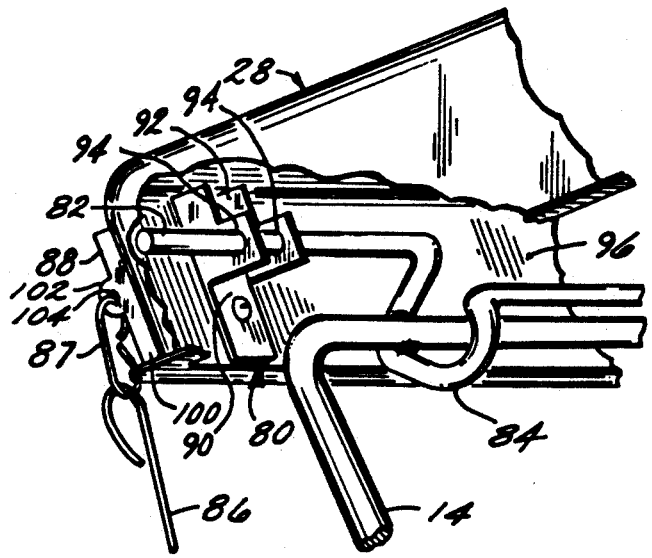
FIG. 7 is an enlarged view along the line 7—7 of FIG. 1.

Foot pedal 30 has a pair of lateral L-shaped extensions 106 which pivotably attach to base 32 at a bearing mount 108. Bearing mount 108 is preferably welded onto latitudinal rods 52 and comprise a cylindrical housing which receives the ends of L-shaped extensions 106 therein. The ends of support rods 86 are looped and are connected to corresponding looped ends of a transverse rod 110 (see FIG. 1) which interconnects both support rods 86 and is welded or otherwise secured to L-shaped extensions 106. Thus, when foot pedal 30 is forced downwardly, extensions 106 will also pivot downwardly (via bearing mount 108) bearing against transverse rod 110. As transverse rod 110 is urged downwardly by extensions 106, support rods 86 will be pulled in the direction illustrated by the arrows in FIG. 1 urging clips 88 in the same direction and causing lid 28 to pivot about extension 82 so as to be urged open as shown in FIGS. 1 and 7. Upon release of the foot pedal, the reverse takes place with the lid pivoting closed.

Figure 8:
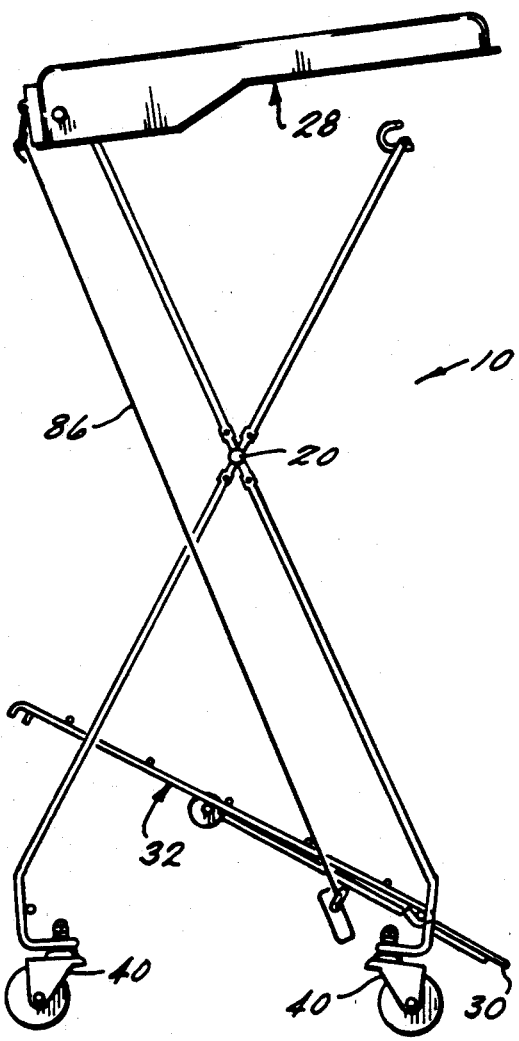
FIG. 8 is a side elevation view of the cart of FIG. 1 during the folding operation.

Referring to FIG. 8, during the closure or folding operation, base 32 is initially disengaged from bar 58 by urging bracket 66 upwardly and lifting base 32 upwardly. At this point, base 32 will swing about the hinge described in conjunction with FIG. 2 and cart 10 will fold into the compact shape shown in FIG. 5 with frame support members 12 and 14 pivoting about fasteners 20 and cover 28 dropping forward and down as it pivots about extensions 82. The significance of member 87 and the looped ends of support rods 86 is apparent in FIG. 5. Thus, during closure, rods 86 will be urged forward with the elongated looped ends and member 87 providing the necessary "float" to preclude rods 86 from bending (compare FIGS. 8 and 5).

It will be appreciated that the important bag holding means described in U.S. Pat. No. 4,549,748 is also included in conjunction with the present invention. Thus, referring now to FIGS. 1-3 of my prior U.S. Pat. No. 4,549,748, each of the two crosspiece segments of U-shaped members 12 and 14 are provided with a pair of bag retention safety bars identified at 38 and 40. These bars 38, 40 are preferably welded onto U-shaped frames 12 and 14, respectively. Safety bars 38 and 40 are preferably comprised of two parallel straight portions 42 and 44 interconnected at each end by a U-shaped retaining member 46. As shown in FIG. 3 of U.S. Pat. No. 4,549,748, when either a plastic or cloth bag 48 is mounted on the cart 10, the bag should be mounted so as to overlap and fit tightly about the two safety bars 38 and 40. If a heavy load is added to the bag 48 and the bag is plastic, the bag will be urged downwardly (and the overlap urged upwardly). In accordance with the present invention if the bag slides as suggested, the outer edges thereof will slip into the notches provided by the two safety bars 38 and 40 and be securely loaded therein. As a consequence thereof, plastic bags 48 will be prevented from prematurely slipping out of the cart 10. It will be appreciated that the bags should not be lifted upwardly out of the cart during changing, but instead should be removed from the front of the cart frame. Also, in a preferred embodiment, strips 60, 62 of the Velcro-type self-adhesive material are applied to at least one of the crosspiece segments of U-shape members 12 and 14. Similarly, corresponding strips of Velcro-type fasteners are attached onto fabric (i.e., cloth, canvas, etc.) bags. Thus, when the fabric bags are mounted onto the cart as shown in FIG. 3, the Velcro-type fasteners will securely fix the heavier (relative to light weight plastic) fabric bags to the cart frame.

Similarly, cart 10 of the present invention may also be used with the various basket assemblies and interlocking correcting devices described in FIGS. 5-8 of U.S. Pat. No. 4,549,478, the disclosure of which has been fully incorporated herein.

The novel bag holding cart of the present invention thus maintains many important features of the earlier cart of U.S. Pat. Nos. 4,549,748 and 4,793,628, while improving on its disadvantages. Among the more important novel features and advances associated with the present invention are:

(1) the adjustable pivotal connection of frame support members 12 and 14;
(2) the bracket 66 for locking base 32 to crossbar 58, thus supporting cart 10 in the upright position shown in FIG. 1; and
(3) the means for mounting casters 42 to reduce the risk of casters 42 becoming lose as a result of vibration during normal use.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. In a foldable bag holding cart having first and second frame means with said first frame means being pivotally connected to said second frame means and each of said first and second frame means having an inverted U-shape, said U-shape including two substantially vertical legs having a crosspiece member therebetween, and a base means being attachable between said first and second frame means, said first and second frame means including bag supporting means with the bag size determined by the lateral distance between the first and second frame means, wherein the improvement comprises:

adjusting means for adjusting the location of the pivotal connection between the first and second frame means, said adjusting means allowing for a selective change in the lateral distance between the first and second frame means, said adjusting means having a plurality of swedged areas at about the center of each of said vertical legs of each of said first and second frame means, each of said swedged areas having a mounting hole therethrough with one of said mounting holes from a first leg of said first frame means being aligned with and pivotally connected to a respective one of said mounting holes from a first leg of said second frame means, and one of said mounting holes from a second leg of said first frame means being aligned with and pivotally connected to a respective one of said mounting holes from a second leg of said second frame means.

2. The cart of claim 1 including:

attachment means for pivotally attaching said base means to either said first or second frame means; and detachable connection means for detachably connecting said base means to either said first or second frame means.

3. The cart of claim 2 including:

crossbar means connected between said vertical legs of each of said first and second frame means;

said attachment means for pivotally attaching said base means to said crossbar means; and said detachable connection means for detachably connecting said base means to said crossbar means.

4. The cart of claim 2 wherein said detachable connection means comprises:

bracket means disposed on said base means, said bracket means having an angled U-shape for retaining said base means in detachable connection with said first or second frame means.

5. The cart of claim 2 wherein said base means comprises:

a rack having longitudinal rods and latitudinal rods transverse to said longitudinal rods.

6. The cart of claim 5 includes:

at least one U-shape channel, each of said U-shape channel disposed at one end of a corresponding one of said longitudinal rods.

7. The cart of claim 5 including:

safety clip means having a first end and a second end, said first end being pivotally attached to either said crossbar means or one of said longitudinal rods from said rack, said second end safety clip means including securing means for effecting secure locking to either said crossbar means or one of said longitudinal rods from said rack.

8. The cart of claim 1 wherein said cover assembly means comprises:

a lid pivotally attached to one of said first or second frame means;

foot pedal means pivotally attached to said base means; and rod extensions connected between said foot pedal means and said lid whereby said rod extensions urge said lid to pivot into an open position when said foot pedal means is pivoted downwardly.

9. The cart of claim 8 wherein:

said lid includes depending side and back portions and further including;

a rigid shaft attached to one of said first or second frame means; and clip means attached to said back portion of said lid, said clip means including openings therethrough for freely receiving said rigid shaft, said rod extensions being connected to said clip means wherein said clip means pivot about said rigid shaft when said rod extensions are actuated by said foot pedal.

10. The cart of claim 1 including:

roller means connected to said first and second frame means whereby said cart is transportable.

11. The cart of claim 1 including:

first and second bag retention bar means, said bar means being attached to said crosspiece members, each of said retention bar means including two parallel straight portions interconnected at each end by U-shape retaining members.

* * * * *